Oct. 22, 1929.  H. T. LOVELL  1,733,025
AUTOMOBILE VENTILATOR
Filed Jan. 28, 1929  2 Sheets-Sheet 1
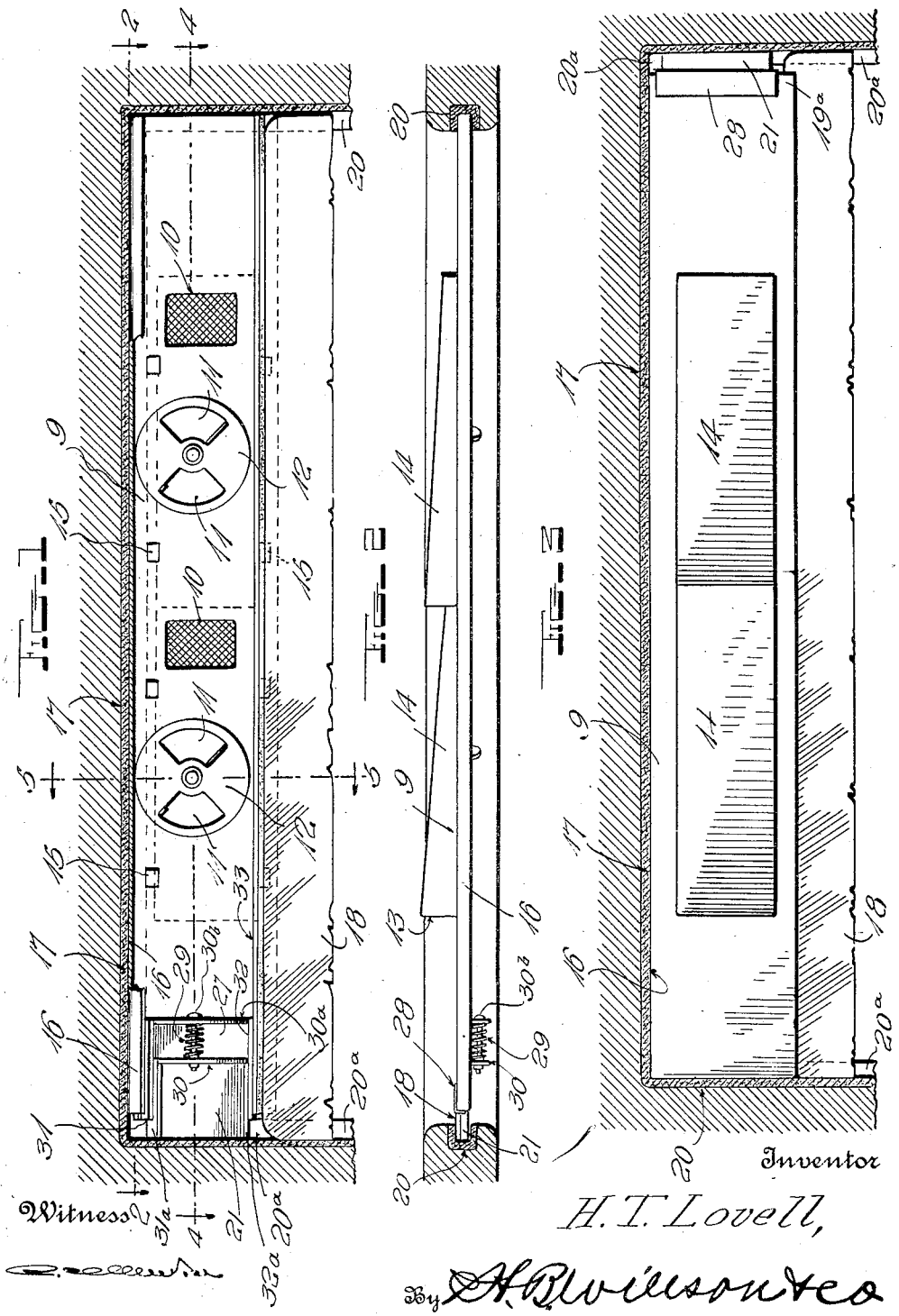
Inventor
H. T. Lovell, Oct. 22, 1929.                H. T. LOVELL                1,733,025
                         AUTOMOBILE VENTILATOR
                         Filed Jan. 28, 1929         2 Sheets-Sheet 2
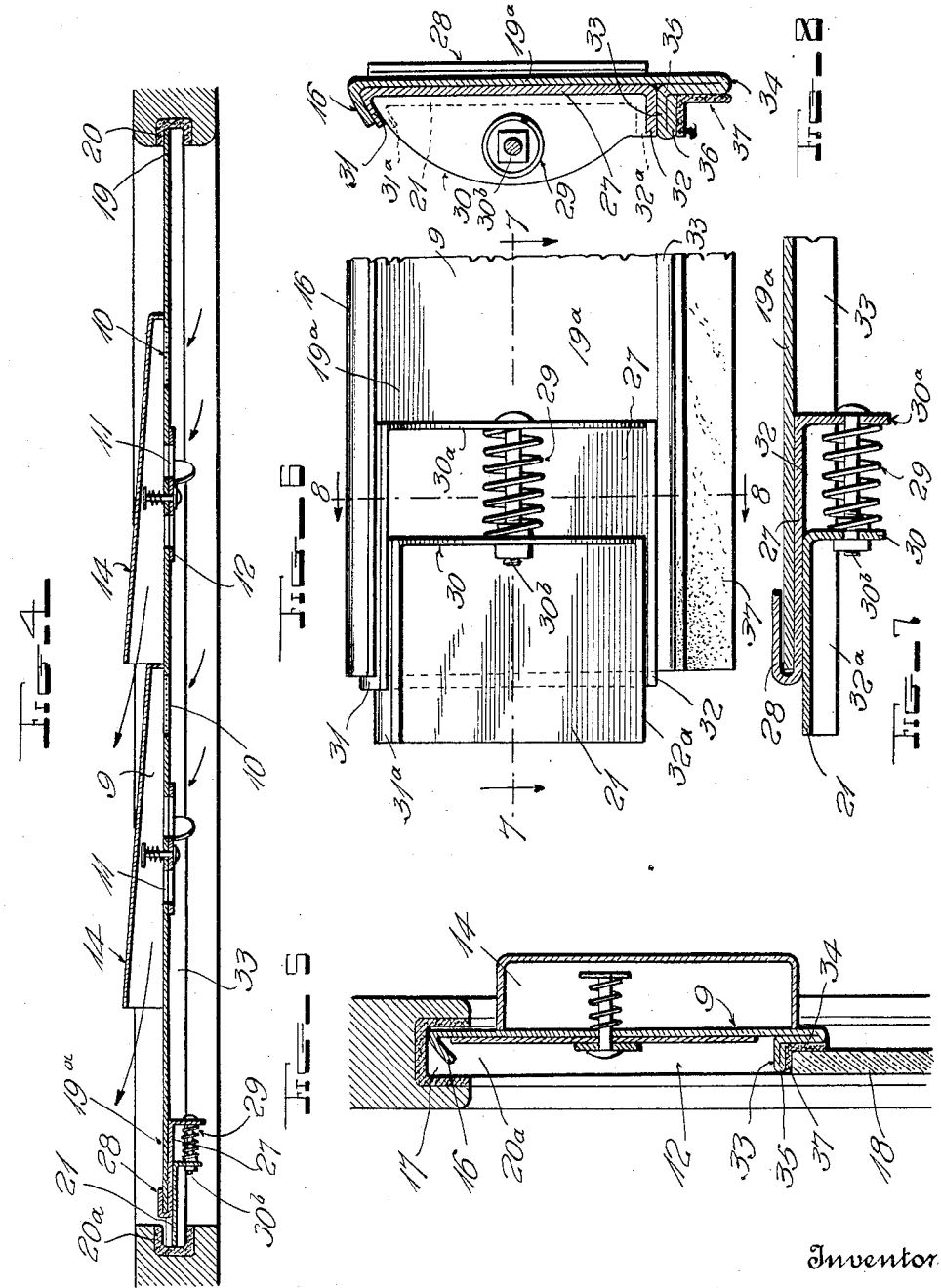
Inventor
H. T. Lovell, Patented Oct. 22, 1929

1,733,025

UNITED STATES PATENT OFFICE

HAROLD T. LOVELL, OF NEW CASTLE, PENNSYLVANIA

AUTOMOBILE VENTILATOR

Application filed January 28, 1929. Serial No. 335,607.

The invention relates to improvements in ventilators adapted to rest upon partially lowered window glasses of automobiles and to engage the usual glass-guiding grooves.

It is the principal object of the invention to provide a new and improved ventilator which is well adapted for use with automobile windows of various widths. In carrying out this end, a horizontally elongated, sheet metal plate which is apertured for ventilating purposes, is manufactured of the maximum length ever required and hence is adapted to be cut off to any shorter length which may be needed. One end of this plate is intended to engage one of the glass-guiding grooves and a spring-projected shoe is employed for engaging the other groove, and it is a further aim of the invention to provide novel means for connecting this shoe with the plate regardless of the length to which the latter be cut.

With the foregoing in view, the invention resides in the novel subject matter hereinafter described and claimed, description being accomplished by reference to the accompanying drawing.

Fig. 1 is a side elevation of the invention and a sectional view of a portion of an automobile window, showing the former in position with respect to the latter.

Fig. 2 is a horizontal sectional view on line 2—2 of Fig. 1.

Fig. 3 is a view similar to Fig. 1 but illustrating the outer side of the ventilator, whereas Fig. 1 discloses the inner side thereof.

Fig. 4 is a horizontal sectional view on line 4—4 of Fig. 1.

Fig. 5 is a vertical transverse sectional view as indicated by line 5—5 of Fig. 1.

Fig. 6 is an enlarged side elevation of one end of the device showing the spring-projected shoe and the means for connecting it with the plate.

Fig. 7 is a horizontal sectional view on the correspondingly numbered line of Fig. 6.

Fig. 8 is a transverse sectional view on line 8—8 of Fig. 6.

In the drawings above briefly described, the numeral 9 denotes a horizontally elongated sheet metal plate of the maximum length ever needed, said plate being apertured for ventilating purposes. In the present showing, this plate is provided with two screened ventilating openings 10 and with other openings 11 whose effective size may be regulated by pivoted, spring-held dampers 12. Cowls or the like 14 are secured to the plate 9 by tongues or other desired means 15, and they extend at the outer side of the plate so that the openings 10—11 open into them. The front ends of these cowls are closed and their rear ends open, so that upon travel of the machine, suction will be created to draw out the foul air, sufficient fresh air entering around windows and doors, through floor boards, etc.

The upper edge of plate 9 is provided with an inwardly projecting inclined flange 16 for reception in the usual top groove 17 for receiving the window glass 18 when the latter is completely raised. One end 19 of this plate is adapted for reception in one of the usual side guide grooves 20 of the window frame and a spring-projected shoe 21 is provided at the other end of said plate for reception in the other side guide groove 20$^a$. The plate 9 may be cut off to any required length and novel provision is made for connecting the shoe 21 with the end 19$^a$ of said plate regardless of the length to which the latter be cut.

A carrying plate 27 is provided for the shoe 21, said plate lying against the inner side of the plate 9 and being provided with a hook 28 to engage the plate end 19$^a$ as shown for instance in Figs. 1, 6 and 7, regardless of the length to which said plate be cut. The shoe 21 is preferably in the form of a plate slidably connected with the plate 27. The upper and lower edges of plate 27 are provided with laterally bent reinforcing flanges 31—32, the flange 31 being inclined transversely and in contact with the lower side of the flange 16 while the flange 32 abuts a flange 33 projecting inwardly from the lower portion of the plate 9 to overlie the upper end of the partially lowered window glass 19. Plate 21 is flanged at 31$^a$—32$^a$ to engage flanges 31—32. A spring 29 acts against vertical flanges 30—30$^a$ on the plates 21—27 to project the former, and projection is limited by a bolt 30$^b$ passing through said spring and through said flange.

By preference, the lower edge of plate 9 is bent upwardly upon itself as at 34, is then bent laterally at 35 and this lateral portion is bent upon itself as denoted at 36, the formations 35 and 36 constituting the flange 33 above described and imparting to it a rigid two-ply construction. In the angle between the flange 33 and the subjacent part of the plate 9, a pad 37 of felt or the like is glued or otherwise fastened to engage the window glass 18.

In applying the device, the glass 18 is partly lowered, the plate 9 is cut to the proper length unless the window be of maximum width, and the plate 27 is then engaged with one end of said plate 9 by sliding said end between the plate 27 and the hook 28. This having been done, the flange 30 may be used as a handle to inwardly move the shoe 21 sufficiently to permit engagement of the plate 9 with the glass-receiving groove 20. When the plate is properly positioned and flange 30 released, the shoe 21 engages the groove 20$^a$ and has a continual tendency to move outwardly due to the spring 29, whereby the ventilator is held firmly in position even though the glass 18 be lowered to quite an extent. When this glass is raised, it seats snugly against the pad 37 of felt or other suitable material and rattling of parts is prevented. Ordinarily, the openings 11 may remain closed but if more ventilation is desired, may be opened to the required extent.

On account of the existing advantages for the details herein disclosed, they are preferably followed. However, within the scope of the invention as claimed, variations may be made.

I claim:—

1. In an automobile ventilator adapted for insertion over a lowered window glass, a horizontally elongated apertured sheet metal plate of the maximum length ever required, whereby said plate is adapted to be cut off to any shorter length needed, one end of said plate being adapted for reception in one of the usual glass-guiding grooves of an automobile window, a spring-projected shoe for reception in the other glass-guiding groove, and means for connecting said shoe with said plate regardless of the length to which the latter be cut.

2. In an automobile ventilator adapted for insertion over a lowered window glass, a horizontally elongated apertured sheet metal plate of the maximum length ever required, whereby said plate is adapted to be cut off to any shorter length needed, one end of said plate being adapted for reception in one of the usual glass-guiding grooves of an automobile window, a spring-projected shoe for reception in the other glass-guiding groove, and a carrier for said shoe provided with means for engaging an end of said plate regardless of the length to which the latter be cut.

3. In an automobile ventilator adapted for insertion over a lowered window glass, a horizontally elongated apertured sheet metal plate of the maximum length ever required, whereby said plate is adapted to be cut off to any shorter length needed, one end of said plate being adapted for reception in one of the usual glass-guiding grooves of an automobile window, a spring-projected shoe for reception in the other glass-guiding groove, and a short sheet metal plate carrying said shoe and adapted to lie against one side of said horizontally elongated plate, said short plate having a hook to embrace an end of the horizontally elongated plate regardless of the length to which the latter be cut.

4. A structure as specified in claim 1; said horizontally elongated plate being provided with upper and lower laterally projecting flanges; said means for connecting said shoe with said plate consisting of a relatively short plate to lie against the horizontally elongated plate and itself flanged for contact with the upper and lower flanges of said elongated plate, and a hook on said short plate to engage an end of said horizontally elongated plate; said shoe comprising a plate lying against said short plate and having flanges lying against the flanges thereof.

In testimony whereof I have hereunto affixed my signature.

HAROLD T. LOVELL.